United States Patent
Hung

(10) Patent No.: US 8,504,287 B2
(45) Date of Patent: Aug. 6, 2013

(54) NAVIGATION SYSTEMS AND METHODS

(75) Inventor: Shun-Cheng Hung, Taipei (TW)

(73) Assignee: Mitac International Corp., Taoyuan (TW)

( * ) Notice: Subject to any disclaimer, the term of this patent is extended or adjusted under 35 U.S.C. 154(b) by 342 days.

(21) Appl. No.: 12/900,935

(22) Filed: Oct. 8, 2010

(65) Prior Publication Data

US 2011/0087432 A1    Apr. 14, 2011

(30) Foreign Application Priority Data

Oct. 9, 2009 (TW) .............................. 98134251 A

(51) Int. Cl.
*G01C 21/00* (2006.01)
(52) U.S. Cl.
USPC ...................................................... 701/429
(58) Field of Classification Search
USPC ................. 701/400, 408, 409, 418, 429, 454, 701/457, 460
See application file for complete search history.

(56) References Cited

U.S. PATENT DOCUMENTS

| 7,743,337 | B1 * | 6/2010 | Maeda et al. | 715/781 |
| 2005/0043880 | A1 * | 2/2005 | Yamane et al. | 701/200 |

FOREIGN PATENT DOCUMENTS

| EP | 1 826 532 A1 | 8/2007 |
| JP | 2009-92493 A | 4/2009 |
| TW | 200703161 A | 1/2007 |

* cited by examiner

*Primary Examiner* — Kim T Nguyen
(74) *Attorney, Agent, or Firm* — Birch, Stewart, Kolasch & Birch, LLP

(57) ABSTRACT

An embodiment of the invention provides a navigation system. A global positioning device outputs location information. A map database provides map information according to the location information. An active area recorder determines a viewing-area, and sketches a first active area according to the viewing-area and a first moving track of a positioning pattern corresponding to the location information. An image processing unit receives the map information and the first moving track and generates display data displayed on a display device.

9 Claims, 6 Drawing Sheets

NAVIGATION SYSTEMS AND METHODS

CROSS REFERENCE TO RELATED APPLICATIONS

This Application claims priority of Taiwan Patent Application No. 098134251, filed on Oct. 9, 2009, the entirety of which is incorporated by reference herein.

BACKGROUND OF THE INVENTION

1. Field of the Invention

The present invention relates to a navigation system, and in particular relates to a navigation system which can show the active area of a user.

2. Description of the Related Art

The navigation system provides user navigation information and the user can go from one place to another more quickly and efficiently. However, if the user comes to a new region and is not familiar with the region, the user does not know which area he has been and which area he has not been. This may waste the user's time. Furthermore, when the user wants to go some place where he has never been before, the present navigation system cannot provide such information on the display map.

BRIEF SUMMARY OF THE INVENTION

An embodiment of the invention provides a navigation method for a navigation system. The method comprises the following steps: labeling a positioning pattern corresponding to a present location of the navigation system in a map shown on a display device; determining a viewing-area of the positioning pattern; changing a display color of the viewing-area to a first color on the display device; and when the navigation system moves, changing the display color of a first active area to the first color, wherein the first active area is determined based on the viewing-area and a first moving track of the navigation system.

Another embodiment of the invention provides a navigation system. The navigation system comprises a global positioning device, a map database, an active area recorder and an image processing unit. The global positioning device outputs location information. The map database provides a map according to the location information. The active area recorder determines a viewing-area and sketches a first active area according to the viewing-area and a first moving track of a positioning pattern corresponding to the location information. The image processing unit receives the map and the first active area to generate and show a display data on a display device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
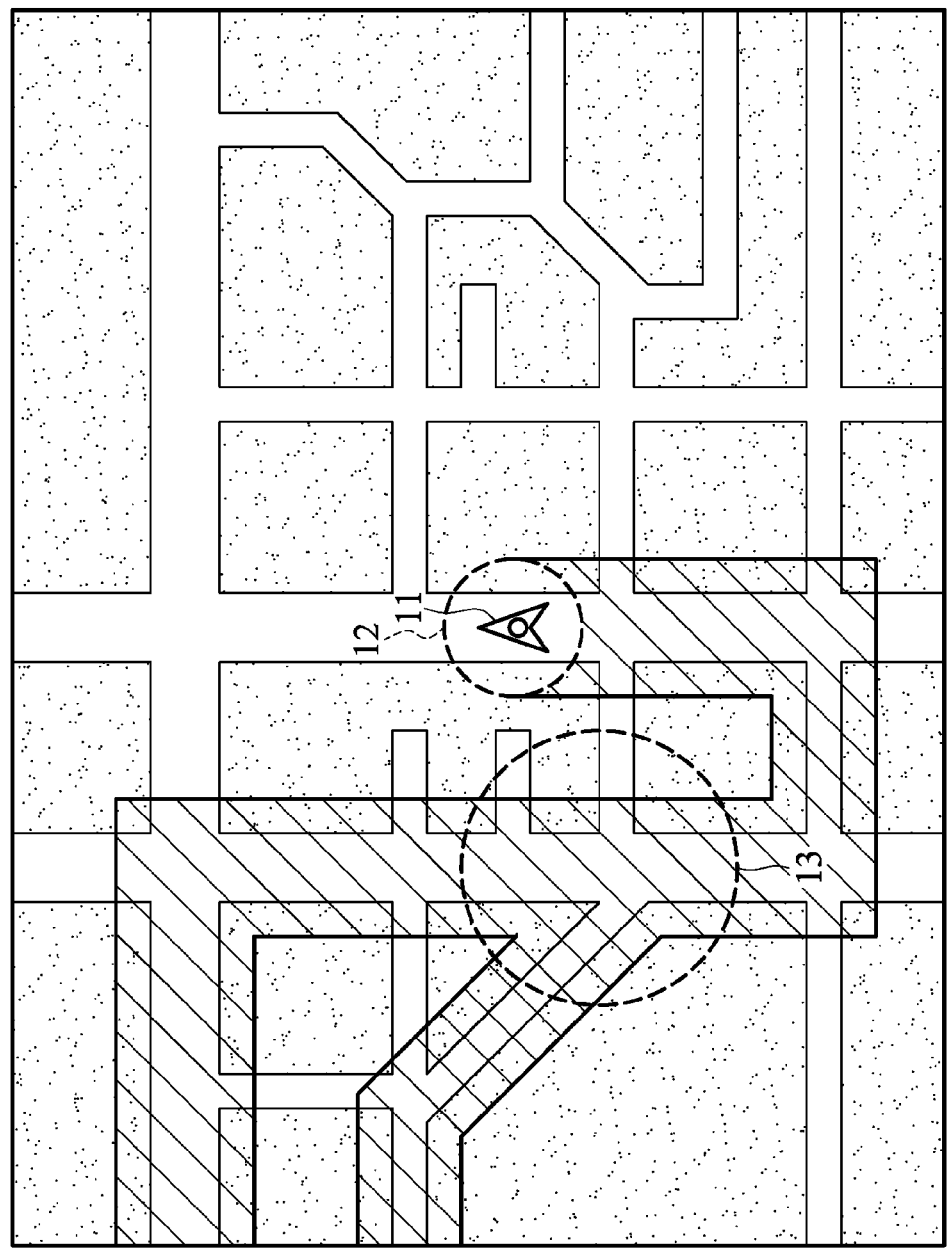
FIG. 1 is a schematic diagram of a navigation method according to an embodiment of the invention.

FIG. 1 is a schematic diagram of a navigation method according to an embodiment of the invention. In FIG. 1, the navigation system uses the Global Positioning System (GPS) to position the current location of the navigation system and shows a positioning pattern 11 corresponding to the current location of the navigation system in the map displayed on a display device. Next, the navigation system determines the size of the viewing-area according to the scale of the map. In one embodiment, the positioning pattern 11 represents the user's current location. If the scale of the map increases, the viewing—area shown in the map decreases, and if the scale of the map decreases, the viewing—area shown in the map increases. In another embodiment, the viewing-area is a circle whose center is the location of the navigation system and the radius is 3 meters. In this embodiment, the viewing-area is illustrated with a circle, but the viewing-area may be a rectangle or other shape.

The hatched region of FIG. 1 represents the positioning pattern 11 of the navigation system had been in a particular area or location. The navigation system continuously detects the positioning pattern's location via the GPS and therefore a moving track of the positioning pattern 11 is generated. The navigation system generates an active area according to the moving track of the positioning pattern 11 and the viewing-area 12, such as the hatched region of FIG. 1. To distinguish the active area from the map, the navigation system uses another display color for the active area of the positioning pattern 11, wherein the display color of the active area is different from the display color of the map. In another embodiment, the display color of the active area is the same as the display color of the map, but with different color depth. The region 13 represents an overlapping region of two different moving tracks of the positioning pattern 11, and the color depth of display color of the region 13 is darker.

The navigation system not only shows the active area of the positioning pattern but also records the last date which the positioning pattern 11 passed. The navigation system changes the color of the active area according to the present date and the last date and the user can know whether he has been there recently. In this embodiment, the navigation system changes the transparency of the display color of active area. For example, the initial transparency of the display color of the active area is set to 100, and if the user does not go to the active area for a period of time, the transparency will decrease till it reaches 0. If the transparency of the display color of the active area is 0, the user sees only the original display color of the map. When the user visits the same place or area again, the transparency will be set to 100 again.

Figure 2:
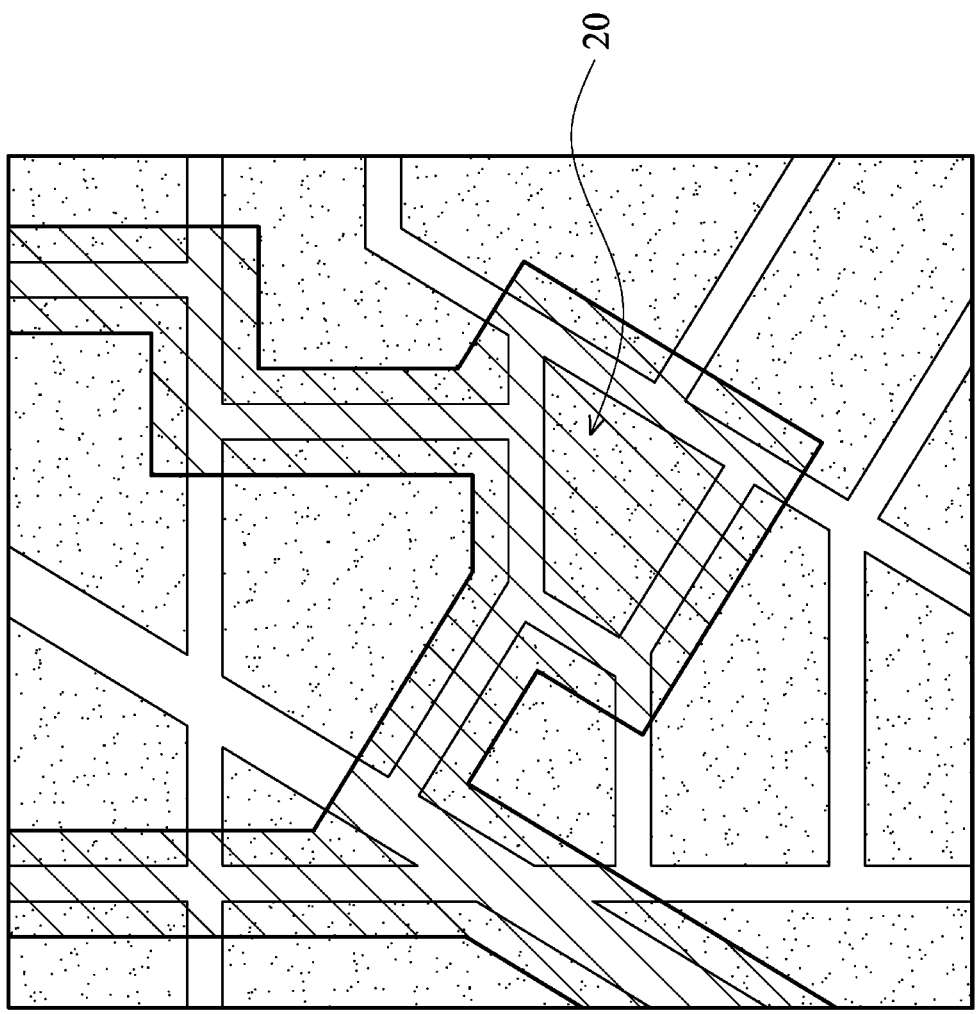
FIG. 2 is a schematic viewing of the map displayed on the monitor of the navigation system according to one embodiment of the invention.

In this embodiment, the active area of the positioning pattern 11 can be divided into several blocks, and then, the transparency change of the active area can be changed block by block. Furthermore, the block size also varies according to the scale of the map. If the scale of the map increases, the block size decreases, and if the scale of the map decreases, the block size increases. Please refer to FIG. 2. FIG. 2 is a schematic viewing of the map displayed on the monitor of the navigation system according to one embodiment of the invention. In FIG. 2, the active area is shown as a hatched region. As shown in FIG. 2, the active area of the moving track of the positioning pattern 11 covers the road and parts of both sides of the road. In another embodiment, the active area may cover the block surrounded by the road, such as the area 20. Furthermore, the display color of the active area can change according to the number of times that the user has been in a particular area or location. In one embodiment the navigation system changes the color depth of the display color of the active area according to the times which user has been in the particular area or location. The more times the user had been in an area, the darker the display color will be. According to the method described, the user can easily know which road or area he had been and how often he had been there according to the information shown on the screen. This can be a reference for user to plan his route.

Figure 3B:
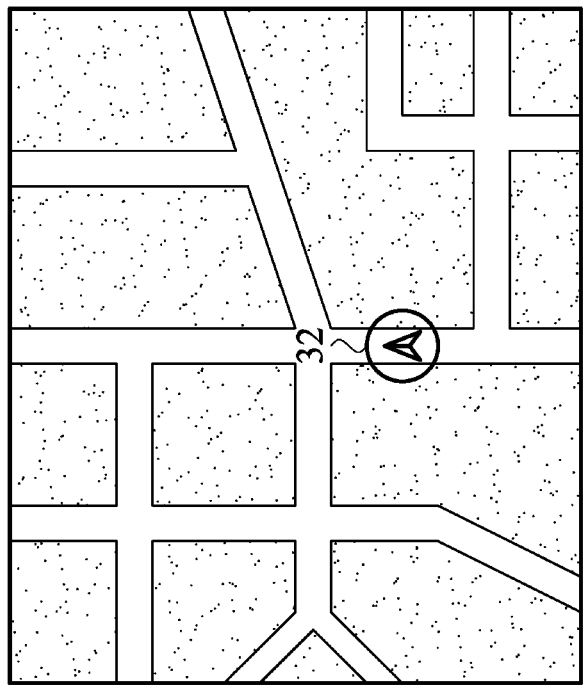
FIG. 3a and FIG. 3b shows different viewing-area size according to different scale of map.
Figure 3A:
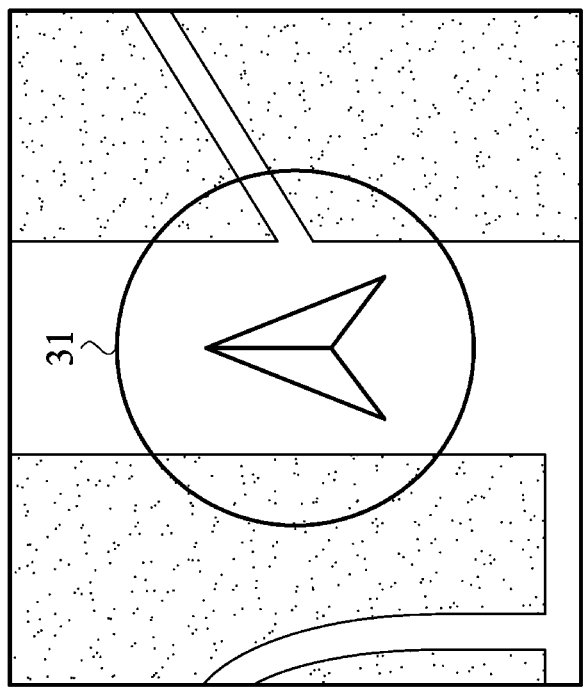

FIG. 3a and FIG. 3b shows different viewing-area size according to different scale of map. The viewing-area is an area within a predetermined distance to the positioning pattern. When the map zooms in or zooms out, the size of viewing-area varies correspondingly. The scale of the map in FIG. 3a is smaller, such as 1:500, and the viewing-area 31 seems larger on the screen of the navigation system. The scale of map in FIG. 3b is larger, such as 1:5000, and the viewing-area 32 seems smaller on the screen of the navigation system. It is noted that the actual size of the viewing-areas 31 and 32 are the same.

Figure 4:
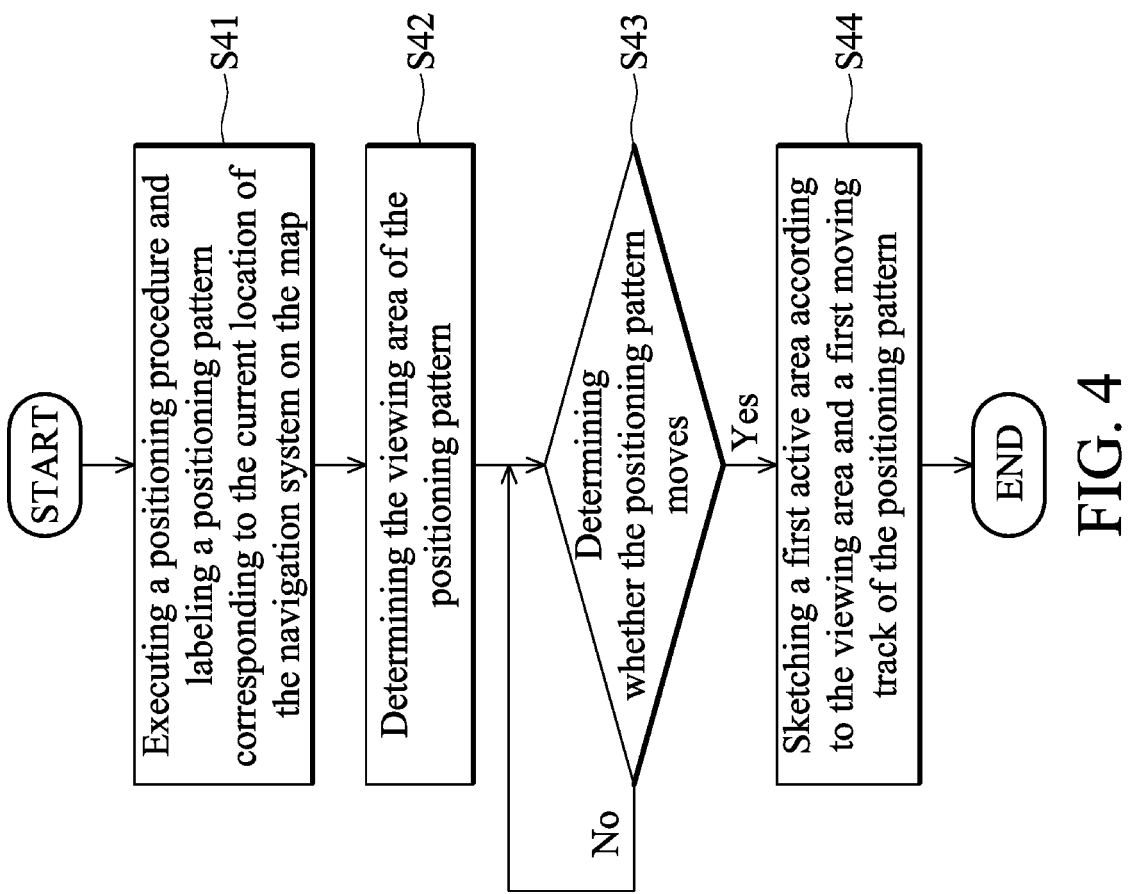
FIG. 4 is a flow chart of a navigation method used by a navigation system according to one embodiment of the invention.

FIG. 4 is a flow chart of a navigation method used by a navigation system according to one embodiment of the invention. In step S41, the navigation system executes a positioning procedure and labels a positioning pattern corresponding to the current location of the navigation system on the map. In step S42, the navigation system determines the viewing area of the positioning pattern. In this step, the viewing area can be set by the user or the navigation system can provide the user with several different viewing sizes. After the size of the viewing area is determined, the navigation system changes the display color of the viewing area to a first color, wherein the map has an initial display color, a second color, which is different from the first color. In step S43, the navigation system determines whether the positioning pattern moves. If not, the procedure stays at step S43. If yes, the procedure goes to step S44. When the positioning pattern moves, the navigation system sketches a first active area according to the viewing area and a first moving track of the positioning pattern, and changes the display color of the first active area to the first color.

In this embodiment, when user uses the navigation system the next time, the navigation system sketches a second active according to the viewing area and a second moving track of the positioning pattern, and changes the display color of the second active area to the first color. If the second active area overlaps the first active area, the color of the overlapped area is darker or changes to a third color.

Furthermore, the navigation system records a generation date of the first active area. When a period of time between the generated date and the current date is longer than a first predetermined period of time, the navigation system adjusts the transparency of the display color of the first active area. For example, the initial transparency of the display color of the active area is set to 100 when the user operates there for the first time, and the navigation system records the date. If one month later and user still does not go to there again, the transparency is set to 80 and decreases till to 0 with the passing of time. If the transparency of the display color of the active area is 0, the user sees only the original display color of the map. In this embodiment, the navigation system places the map and the active area in different picture layers and shows simultaneously. Therefore, if the transparency is 0, only the map is shown.

Figure 5:
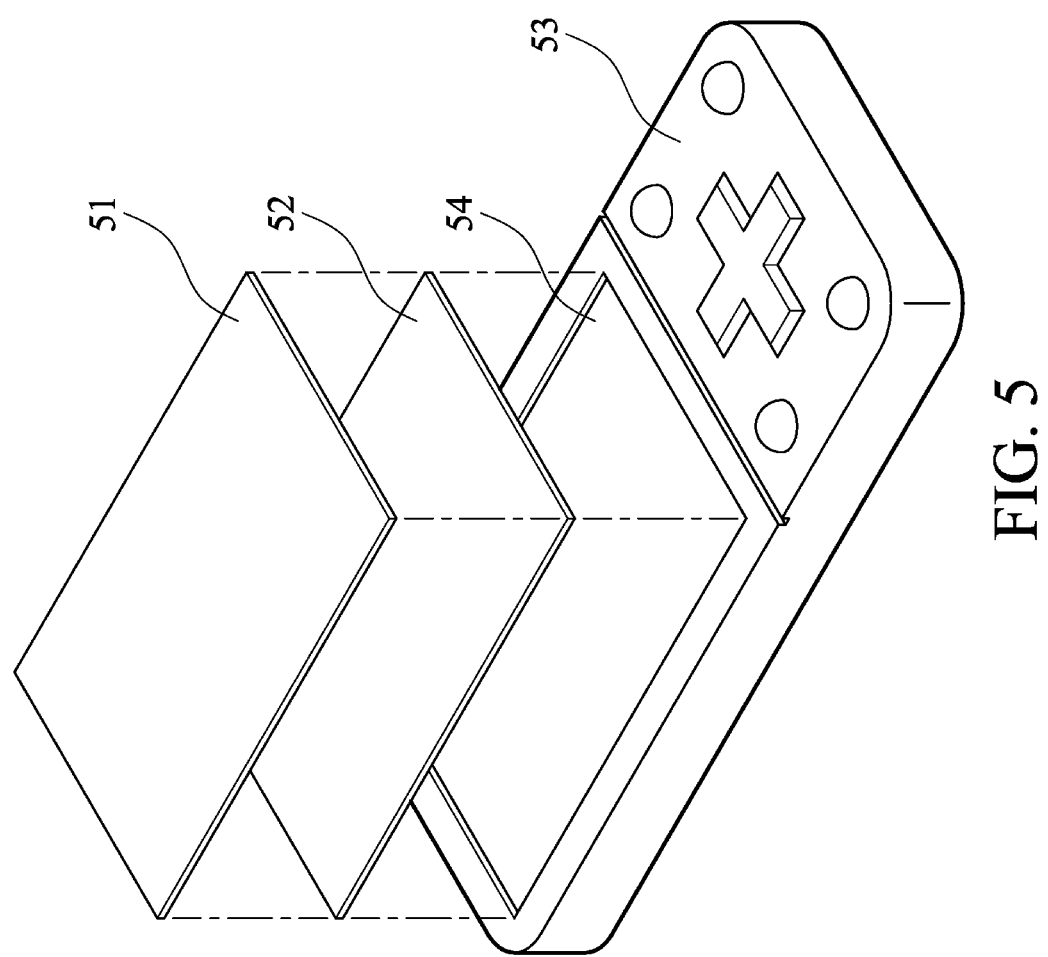
FIG. 5 is a schematic diagram of a navigation system according to one embodiment of the invention.

For further description of the display operation of the active area and map, please refer to FIG. 5. FIG. 5 is a schematic diagram of a navigation system according to one embodiment of the invention. In FIG. 5, the navigation system 53 comprises a display device 54. The map is displayed on the first layer 52, the active area is displayed on the second layer 51, and the navigation system 53 overlapping shows the first layer 52 and the second layer 51 on the display device 54 at the same time. Thus, user can sees the map and knows which areas he has been.

Figure 6:
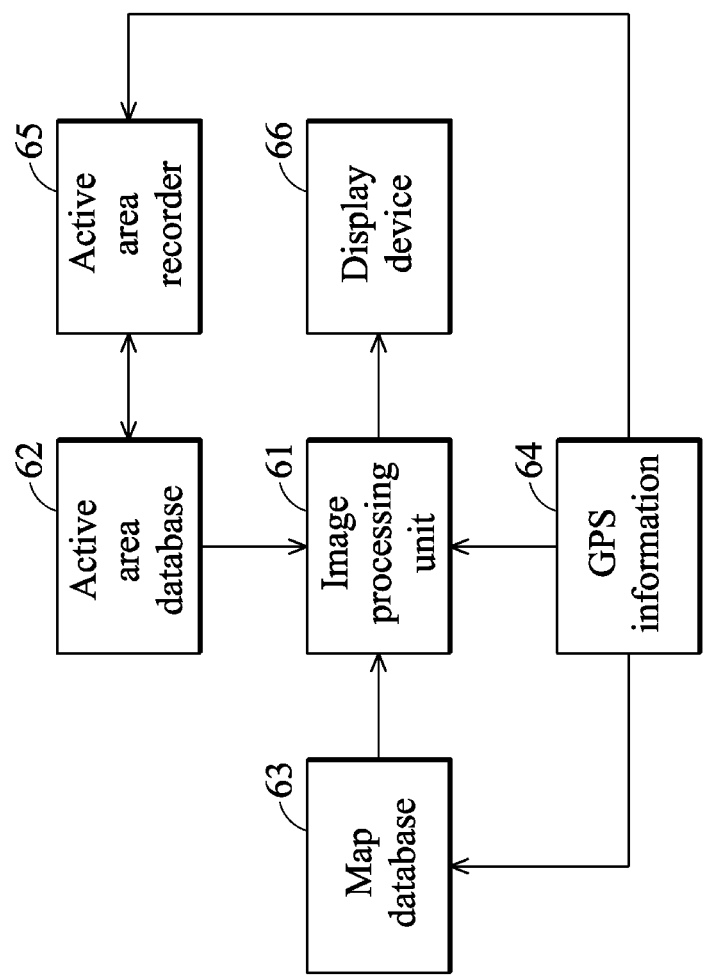
FIG. 6 is a functional block diagram of an embodiment of the navigation system according to the invention.

FIG. 6 is a functional block diagram of an embodiment of the navigation system according to the invention. The navigation system comprises image processing unit 61, active area database 62, map database 63, GPS information 64 and active area recorder 65. The map database 63 selects and transmits a corresponding map according to the GPS information 64. In this embodiment, the GPS information 64 is generated after receiving the satellite signals. The active area recorder 65 selects and transmits active area data corresponding to the map to the image processing unit 61. The image processing unit 61 generates a display data according to the received map and active area and displays it via a display device 66. The active area recorder 65 determines a viewing-area of the user and sketches a first active area according to the viewing-area and a first moving track of the user. The image processing unit 61 displays the active area in other colors to distinguish it from the display color of the map. As to the generation of the active area and how the frequency, which denotes where the user has been in the active area, is displayed are described in FIG. 1 to FIG. 4.

It is noted that the described embodiments are applied only when the search or exploration function of the navigation system is enabled. By executing the search or exploration function, the user can immediately know which area he had been visited on the displayed map. When the search or exploration function is disabled, the navigation system goes back to a normal navigation mode and does not respond to user's moving track.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A navigation method for a navigation system, comprising:
    displaying a map having a second display color on a display device;
    labeling a positioning pattern corresponding to a present location of the navigation system on the map;
    determining a viewing-area of the positioning pattern;
    changing a display color of the viewing-area from the second color to a first color, wherein the second color is different from the first color ; and when the navigation system moves, changing the display color of a first active area to the first color, wherein the first active area is determined based on the viewing-area and a first moving track of the navigation system.

2. The method as claimed in claim 1, further comprising: showing a second active area on the display device according to the viewing-area and a second moving track of the navigation system, and changing the display color of the second active area to the first color.

3. The method as claimed in claim 2, wherein when the second active area overlaps the first active area, the color of an overlapping area of the first active area and the second active area is changed to a third color.

4. The method as claimed in claim 3, wherein the third color is different from the first color.

5. The method as claimed in claim 1, further comprising: recording a generation date of the first active area; and when a period of time between the generated date and current date is longer than a first predetermined period of time, adjusting a transparency of the first color.

6. The method as claimed in claim 5, wherein when a period of time between the generated date and current date is longer than a second predetermined period of time, the display color of the first active area is changed to the second color.

7. The method as claimed in claim 1, wherein the viewing-area is a circle or a rectangle.

8. The method as claimed in claim 1, wherein the viewing-area varies according to a scale of the map.

9. The method as claimed in claim 1, wherein the map is shown at a first display layer, the first active area is shown at a second display layer, and the map and the first active area are simultaneously shown by an image processing device.

* * * * *